United States Patent
Jones et al.

(10) Patent No.: US 10,632,504 B2
(45) Date of Patent: Apr. 28, 2020

(54) SYSTEMS AND METHODS FOR SORTING MECHANISMS AT A TERMINAL

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Robert James Taylor, Rogers, AR (US); Aaron Vasgaard, Fayetteville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 29 days.

(21) Appl. No.: 15/850,823

(22) Filed: Dec. 21, 2017

(65) Prior Publication Data

US 2018/0169709 A1 Jun. 21, 2018

Related U.S. Application Data

(60) Provisional application No. 62/437,491, filed on Dec. 21, 2016.

(51) Int. Cl.
| | |
|---|---|
| *B07C 5/36* | (2006.01) |
| *G07G 1/00* | (2006.01) |
| *A47F 9/04* | (2006.01) |
| *G06Q 20/20* | (2012.01) |
| *B07C 5/34* | (2006.01) |
| *G06Q 20/00* | (2012.01) |

(52) U.S. Cl.
CPC ............. *B07C 5/362* (2013.01); *A47F 9/047* (2013.01); *B07C 5/3412* (2013.01); *G06Q 20/00* (2013.01); *G06Q 20/208* (2013.01); *G07G 1/0054* (2013.01)

(58) Field of Classification Search
CPC ....... B07C 5/3412; B07C 5/361; B07C 5/362; B07C 5/38; B07C 2501/0081; G07G 1/0036; G07G 1/0054; A47F 9/047; G06Q 20/20; G06Q 20/208
See application file for complete search history.

(56) References Cited

U.S. PATENT DOCUMENTS

| | | | |
|---|---|---|---|
| 3,678,660 A | 7/1972 | Musser | |
| 5,406,770 A | 4/1995 | Fikacek | |
| 6,793,043 B2 | 9/2004 | Nguyen | |
| 7,386,472 B1* | 6/2008 | Bogat | G06Q 10/06 |
| | | | 705/23 |
| 7,575,161 B2 | 8/2009 | Nguyen et al. | |
| 7,648,066 B2 | 1/2010 | Kangas et al. | |
| 7,866,546 B1 | 1/2011 | Vance | |

(Continued)

OTHER PUBLICATIONS

ROL presents CheckOut Counter CT-8000. Video published by ROLchectec, published on Jun. 9, 2010, available at https://www.youtube.com/watch?v=EpeO8oaXhCw.

(Continued)

*Primary Examiner* — Joseph C Rodriguez
(74) *Attorney, Agent, or Firm* — McCarter & English, LLP; David R. Burns (57) ABSTRACT

Methods, systems, and apparatuses are provided for sorting mechanisms at a POS terminal. A POS terminal in a secondary mode of operation, receives input of categories. Information of items received by the POS terminal is used to sort the items into the categories.

7 Claims, 8 Drawing Sheets

(56) References Cited

U.S. PATENT DOCUMENTS

| | | |
|---|---|---|
| 8,086,344 B1 | 12/2011 | Mishra et al. |
| 8,175,935 B2 | 5/2012 | Dearlove et al. |
| 8,584,805 B2 | 11/2013 | Nelson et al. |
| 8,783,438 B2 | 7/2014 | Phan et al. |
| 9,024,755 B2 | 5/2015 | Fuhr et al. |
| 9,277,833 B1 | 3/2016 | Vance |
| 9,457,965 B2 * | 10/2016 | Baitz ..................... A47F 9/047 |
| 2003/0001007 A1 | 1/2003 | Lee et al. |
| 2006/0265294 A1 | 11/2006 | de Sylva |
| 2008/0054071 A1 | 3/2008 | Kangas et al. |
| 2008/0301102 A1 | 12/2008 | Liang |
| 2009/0090584 A1 | 4/2009 | Chakra et al. |
| 2009/0127168 A1 | 5/2009 | Mallett et al. |
| 2014/0252089 A1 | 9/2014 | Bostwick |
| 2014/0353115 A1 | 12/2014 | Baitz et al. |
| 2016/0039611 A1 | 2/2016 | Hoynash et al. |
| 2016/0048798 A1 | 2/2016 | Meyer et al. |
| 2016/0098669 A9 | 4/2016 | Kantarjiev et al. |

OTHER PUBLICATIONS

International Search Report and Written Opinion for Application No. PCT/US2017/067872, dated Mar. 1, 2018. 22 pages.

\* cited by examiner

SYSTEMS AND METHODS FOR SORTING MECHANISMS AT A TERMINAL

RELATED APPLICATION

This application claims priority to U.S. Provisional Patent Application No. 62/437,491 filed on Dec. 21, 2016, which is hereby incorporated by reference in its entirety.

BACKGROUND

Items are sorted for various reasons and tasks. Manual sorting of items is prone to inconsistencies and is a slow process.

SUMMARY

In one embodiment, a method includes receiving, at a Point-of-Sale (POS) terminal, a first input from a user causing the POS terminal to operate in a secondary mode of operation, and receiving a second input from the user at the POS terminal indicating categories. The method also includes reading data from machine readable identifiers associated with items, and determining using an identification module at the POS terminal to which of the categories the items corresponds. The method also includes sending signals from the POS terminal to an electromechanical apparatus operatively coupled to the POS terminal to automatically operate the electromechanical apparatus to cause mechanical movement in a component of the electromechanical apparatus based on the determining, where the mechanical movement in the component physically sorts the items.

In another embodiment, a sorting system includes a POS terminal having a processor and a scanner, and a detachable electromechanical apparatus operatively coupled to the POS terminal. The electromechanical apparatus includes a diverter with an arm controllable by the POS terminal, a conveyor belt detachably disposed between the POS terminal and the diverter, and at least two sectors extending distally from the diverter. The POS terminal is configured to operate in a secondary mode of operation in response to receiving a first input from a user. The POS terminal is further configured to receive a second input from the user indicating categories, read data, via the scanner, from machine readable identifiers associated with items, and determine using an identification module to which of the categories the items correspond. The POS terminal is further configured to send signals to the electromechanical apparatus to automatically operate the electromechanical apparatus to cause mechanical movement of the arm of the diverter based on the determining, where the mechanical movement of the arm of the diverter physically sorts the items.

In yet another embodiment, a sorting system includes a POS terminal having a processor and a scanner, and a carousel operatively coupled to the POS terminal. The POS terminal is configured to operate in a secondary mode of operation in response to receiving a first input from a user, receive a second input from the user indicating categories, and read data, via the scanner, from machine readable identifiers associated with items. The POS terminal is further configured to determine using an identification module to which of the categories the items correspond, and send signals to the carousel to automatically operate the carousel to cause mechanical movement of the carousel based on the determining.

BRIEF DESCRIPTION OF THE DRAWINGS

The accompanying figures, which are incorporated in and constitute a part of this specification, illustrate one or more embodiments of the present disclosure and, together with the description, help to explain the present disclosure. The embodiments are illustrated by way of example and should not be construed to limit the present disclosure. In the figures.

DETAILED DESCRIPTION

Systems, methods, computer readable medium and apparatuses are described for sorting mechanisms at a POS terminal. Exemplary embodiments are employed at a terminal (i.e., a POS terminal) and when the terminal is configured in a secondary mode of operation. In one embodiment, the terminal can receive an input indicating categories, and associates each category to a section of a carousel. The terminal reads data from items, and determines to which of the categories the items correspond. Based on the determined category for each item, the terminal can send a signal to the associated section of the carousel to automatically activate a visual indicator coupled to the associated section. Further, the terminal analyzes storage location information of the items to generate route instructions directing a user to storage locations for the sorted items. In exemplary embodiments, the terminal can receive an input indicating categories, and can read data from machine readable identifiers associated with the items. The terminal can determine which of the categories the item corresponds, and can send a signal to an electromechanical apparatus operatively coupled to the terminal to cause a movement in a component of the electromechanical apparatus.

The items may be sorted based on storage location of the items, physical characteristics, non-physical characteristics, or other factors.

The terminal is operated in a secondary mode of operation, where the terminal may not be capable of performing operations of the primary mode of operation while in the secondary mode of operation (e.g., the primary and secondary modes of operation maybe exclusive of one another). Providing primary and secondary modes of operation, where the secondary mode of operation can be used for sorting allows a terminal that is not in use for its primary function or mode to be utilized for the secondary purpose of sorting. This reduces waste of resources and downtime of terminals.

Exemplary embodiments include a carousel having at least two sections. The carousel is operatively coupled to the terminal. In one embodiment, the terminal can send a signal to the visual indicator associated with a section of the carousel to automatically activate it to identify the appropriate section in which an item should be placed. The signal is sent to the carousel section based on identifying to which category an item corresponds. The terminal can send a signal to the carousel to automatically rotate the carousel to present the appropriate section of the carousel in which the item should be placed to the user. The signal is sent to the carousel section based on identifying to which category an item corresponds.

Exemplary embodiments can include a diverter with an arm, and at least two sectors extending from the diverter. The terminal sends a signal to the arm of the diverter to automatically move the arm based on identifying to which category an item corresponds. The movement of the arm physically sorts the items into categories.

Figure 1:
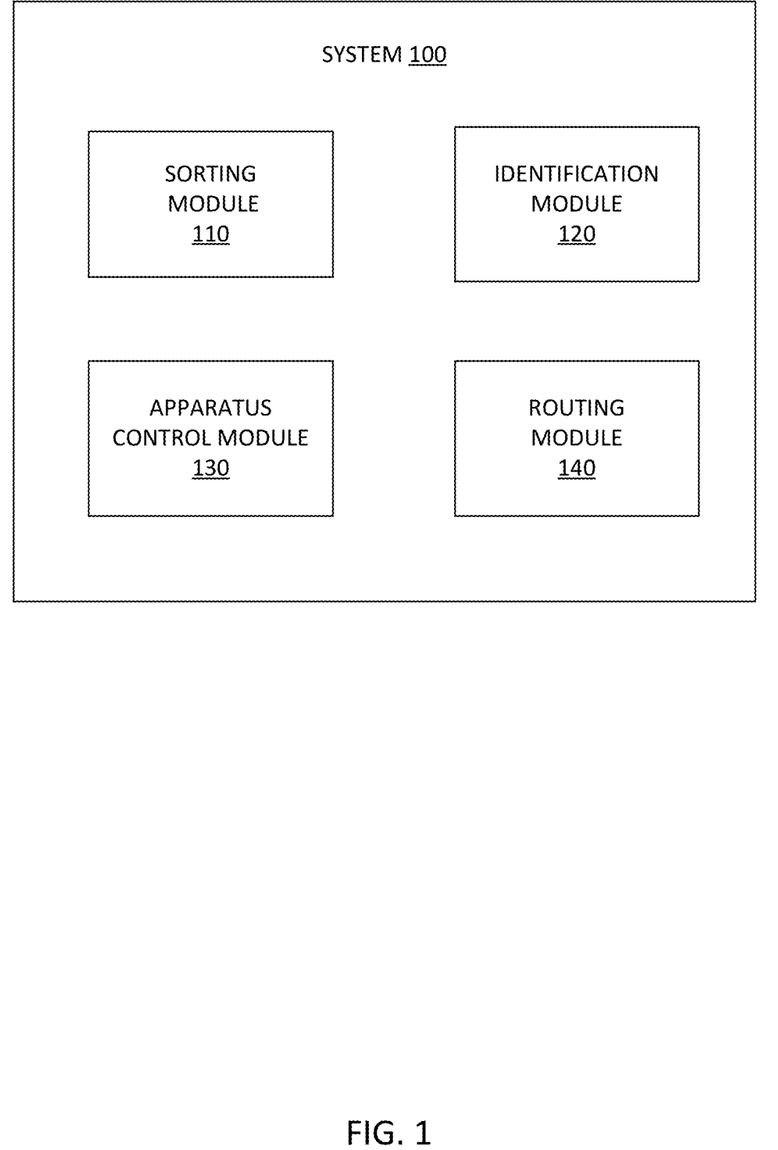
FIG. 1 is a block diagram showing an exemplary system for sorting mechanisms at a terminal, according to an example embodiment.

FIG. 1 is a block diagram showing a system 100 in terms of modules for sorting mechanisms, according to an example embodiment. The one or more of the modules may be implemented in server 730 shown in FIG. 7. In alternative embodiments, one or more of the modules may be implemented in POS terminal 710, 720 shown in FIG. 7. The modules include a sorting module 110, an identification module 120, an apparatus control module 130, and a routing module 140. The modules may include various circuits, circuitry and one or more software components, programs, applications, or other units of code base or instructions configured to be executed by one or more processors (e.g., included in the terminal 710, 720 and/or the server 730 shown in FIG. 7). Although modules 110, 120, 130, 140 are shown as distinct modules in FIG. 1, it should be understood that modules 110, 120, 130, and 140 may be implemented as fewer or more modules than illustrated. It should be understood that in some embodiments any of modules 110, 120, 130, and 140 may communicate with one or more components included in exemplary embodiments (e.g., terminal 710, terminal 720, server 730, or database(s) 740, 745 of system 700 shown in FIG. 7).

The sorting module 110 may be configured to analyze input received from a user at the terminal. The sorting module 110 may also cause the terminal to operate in a secondary mode of operation based on input from a user, e.g., the terminal can be configured to operate in a primary mode of operation and the secondary mode of operation. In some embodiments, the sorting module 110 may assign or programmatically associate a category with each portion or section of a carousel or sectors that may be operatively coupled to the terminal.

The item identification module 120 may be configured to manage and analyze data related to multiple items, and identify or determine the category of the item. The item identification module 120 may identify a category for an item based on a stocking location of items in a facility, delivery location of items, characteristics of the items, fulfillment, or other factors. In some embodiments, the item identification module 120 may identify a section of the carousel or a sector that corresponds to the item based on the identified category for the item. In some embodiments, the item identification module 120 may receive data from multiple machine readable identifiers associated with items. The item identification module 120 may store the category identified for an item in a database. In some embodiments, the item identification module 120 may store a location of the item in a database. In some embodiments, the categories can be generated dynamically as the machine readable identifiers of the items are read.

The apparatus control module 130 may be configured to operate an electromechanical apparatus or a component of an electromechanical apparatus operatively or electrically coupled or connected to the terminal. The apparatus control module 130 may cause the terminal to send a signal to the apparatus to operate it. In some embodiments the apparatus control module 130 may send a signal to an electric circuit to control a visual indicator corresponding to a section of a carousel or to a sector. In some embodiments, the electric circuit can include programmable logic that can be programmed to control the visual indicators based on the categories of the items. In some embodiments, the apparatus control module 130 may cause electromechanical movement in a component of the apparatus. For example, the apparatus control module 130 may cause rotation of a carousel. As another example, the apparatus control module 130 may cause movement of an arm of a diverter.

The routing module 140 may be configured to analyze data related to items, in particular location of items in a facility, to generate route instructions for a user to place or stock the items sorted at the terminal. The routing module 140 may retrieve data from a database storing location information of items.

Figure 2:
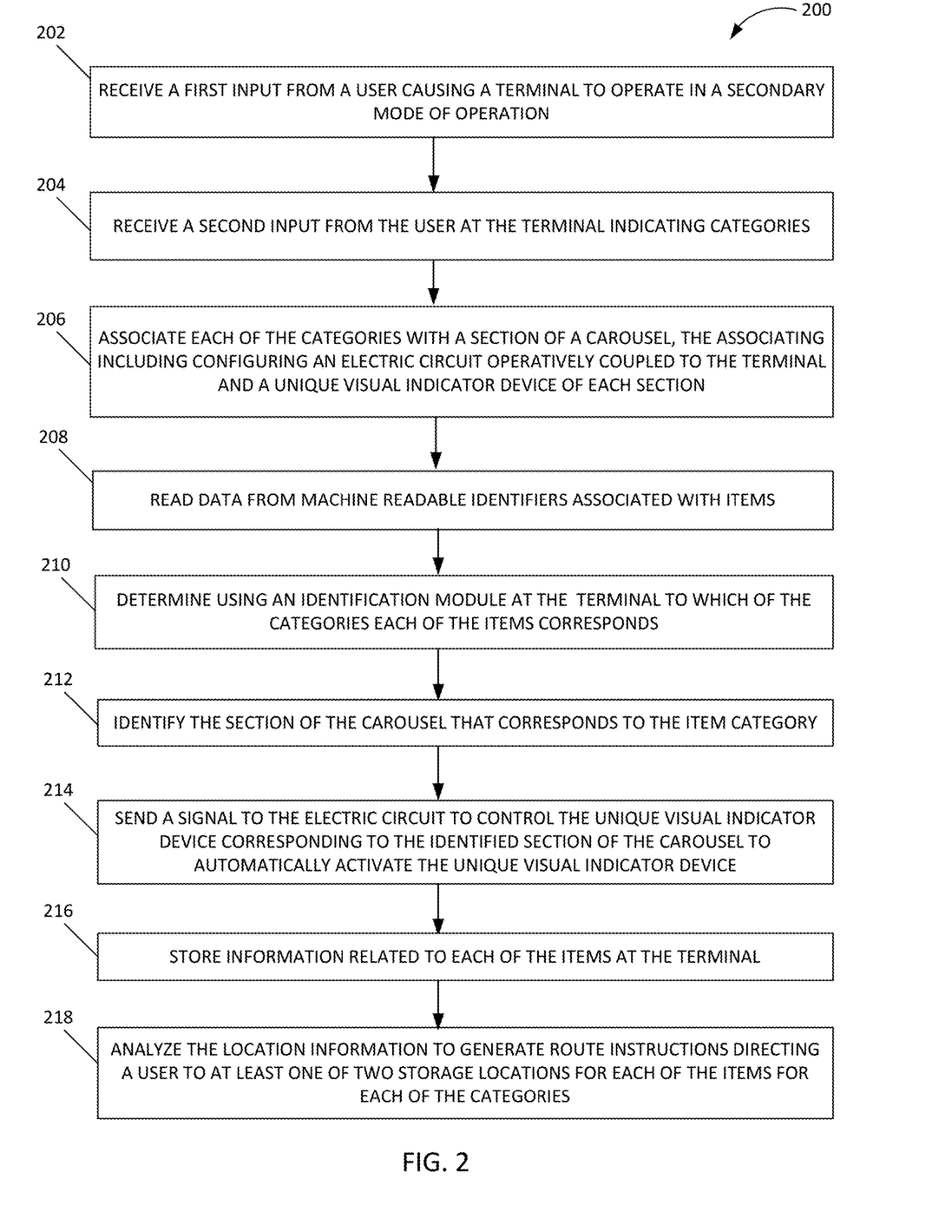
FIG. 2 is a flowchart illustrating an exemplary method for sorting mechanisms at a terminal, according to an example embodiment.

FIG. 2 is a flowchart illustrating an exemplary method 200 for sorting mechanisms at a POS terminal, according to an example embodiment. The method 200 may be performed using one or more modules of the system 100 described above.

At step 202, the sorting module 110 receives a first input from a user causing a terminal to operate in a secondary mode of operation. The terminal may be configured for a first mode of operation that may be the primary mode of operation for the terminal. An input from the user at the terminal causes the terminal to enter or switch to a secondary mode of operation, which is different than and/or exclusive of the primary mode of operation. In the secondary mode of operation, the terminal executes software related to the systems and methods described herein for the secondary mode of operation. In an example embodiment, the terminal is unable to perform operations associated with the primary mode of operation when the terminal is in the secondary mode of operation. For example, the terminal may be configured to perform transactions as the primary mode of operation. In the secondary mode of operation of sorting items, the terminal cannot perform transactions. That is, when an item is scanned at the terminal, rather than adding the item to a transaction, the terminal retrieves location information or characteristics of the item which is used to sort the items into categories and/or control an electromechanical apparatus or a component thereof to facilitate the sorting.

At step 204, the sorting module 110 receives a second input from the user at the terminal indicating multiple categories. In an example embodiment, the categories are based on storage locations of the items in a facility and/or the characteristics of the items (physical or non-physical). The user may input information for two or more categories at the terminal. The information may include at least a name of the category. For example, the categories may include, but are not limited to, beauty, personal care, pharmacy, electronics, office, movies, music, books, home improvement, furniture, patio furniture, toys, video games, food, household supplies, cleaning products, pet, photo, gifts, and the like. As another example, the categories may be based on the storage temperature of the items, and may include, but are not limited to, hot items, cold items, frozen items, room-temperature items, and the like. As another example, the categories may be based on the storage or compliance requirements of the items, and may include, but are not limited to, chemicals (e.g., cleaning supplies, pest control items, etc.), food items, clothing items, baby or childcare items, and the like. In this manner, the categories allow items to be sorted based on temperature of items so that hot items are not placed in the same container or bag as cold items. The categories also allow items to be sorted based on compliance or storage requirements so that chemicals are not placed in the same container or bag as food items or baby/childcare items, and food items are not placed in the same container or bag as clothing items.

In an example embodiment, the second input at the terminal is a list of items shipped to the facility that needs sorting. This list may be provided by a user as an input at the terminal. Alternatively, the list may be retrieved by the terminal from a server or a computing device that stores the list. Based on the items included on the shipment list, the terminal may determine two or more categories for sorting items.

In another embodiment, the second input at the terminal is list of returned items. This list may be provided by a user as an input at the terminal. Alternatively, the returned items list may be retrieved by the terminal from a server or a computing device that stores the list. Based on the items included on the returned items list, the terminal may determine two or more categories for sorting items.

In yet another embodiment, the second input at the terminal is from a machine readable identifier affixed to a bin containing a particular set of items. The terminal may retrieve a list of items that may be contained in the bin identified by the scanned machine readable identifier. Based on the items included on the bin list, the terminal may determine two or more categories for sorting items.

In yet another embodiment, the second input at the terminal is data read from machine readable identifiers associated with items. The terminal may identify one or more characteristics of the item based on the machine readable identifier, and can determine a category for sorting items. When a subsequent item's machine readable identifier is scanned, the terminal may determine another category for sorting items. Alternatively, the terminal may determine that the subsequent item belongs to the first determined category. As such, the terminal can dynamically generate two or more categories for sorting items based on the items' characteristics.

At step 206, the sorting module 110 associates each of the categories with a section of a carousel or with a particular sector. The associating includes configuring an electric circuit (e.g., a programmable logic circuit) operatively coupled to the terminal and a unique visual indicator device of each section or for each sector. The sorting module 110 may programmatically associate a category to a section of the carousel or to a particular sector, and store the association in memory at the terminal. In an example embodiment, the carousel has at least three sections, and each section has a tote or container to hold items as they are sorted. Each section of the carousel also includes or is coupled to a visual indicator device. In an example embodiment, the visual indicator device is a light emitting diode (LED). In some embodiments, each section may have a different colored LED. In another example embodiment, the visual indicator device may be a monitor capable of displaying graphical images or text. In another example embodiment, each section of the carousel may also include an audible indicator device. In other embodiments, each section of the carousel may also include other indicator devices that enables a user to recognize which section an item should be placed.

At step 208, the identification module 120 reads data from machine readable identifiers associated with items. The terminal includes a scanner (e.g., an optical scanner) capable of reading data from machine readable identifiers or machine readable optical labels, for example, barcodes, linear barcodes, Quick Response (QR) codes, two-dimensional barcodes, matrix barcodes, and the like. A user may scan the machine readable identifier affixed on an item or items at the terminal. The terminal may identify or retrieve information from a database (e.g., location database(s) 740 or item database(s) 745) related to the scanned item and store it in memory.

At step 210, the identification module 120 determines to which of the categories each of the items corresponds. The identification module 120 may analyze information related to the scanned items to determine which of the categories each item corresponds. The identification module 120 may use storage location information of an item to determine the corresponding category. In other embodiments, the identification module 120 may use other characteristics of the item to determine the corresponding category.

At step 212, the identification module 120 identifies the section of the carousel or a particular sector that corresponds to the item category. The association between the categories and the sections of the carousel or the sectors are stored in memory at the terminal, and the identification module 120 uses this stored information to identify the appropriate section of the carousel or the particular sector.

At step 214, the apparatus control module 130 sends a signal to the electric circuit to control the unique visual indicator device corresponding to the identified section of the carousel or the sector to automatically activate the unique visual indicator device associated therewith. The electric circuit is operatively coupled to the terminal and each of the unique visual indicator devices. The signal from the terminal activates the appropriate unique visual indicator to indicate to the user which section or sector the item should be placed. In this manner, the user can easily identify the section of the carousel or the sector (which is determined based on a category), and sort items easily and efficiently based on categories.

In an example embodiment, each section of the carousel includes a weight sensor (e.g., weight sensors 430, 431, 432, and 433 illustrated in FIG. 4) that transmits weight data measured at the section of the carousel to the terminal. If the weight of a particular section is greater than a predefined weight, then the terminal sends a signal to the electric circuit to control the unique visual indicator device of that particular section to indicate that the section has reached a weight limit, and therefore additional items should not be sorted or placed in the section.

In an example embodiment, an audible indication is provided to the user for the identified section or sector of the carousel in which the item should be placed. Each section or sector of the carousel may be identified by a number. The terminal may generate an audible indicating the number of the identified section or sector in step 212. For example, the identified section or sector may be number two, then the terminal generates an audible sound via one or more speakers coupled to it, e.g., indicating "two."

At step 216, the routing module 140 stores information related to each of the items at the terminal. The information includes location information for each of the items based on where the items are stored in a facility. The storage information for an item may be retrieved from a database (e.g., location database(s) 740).

At step 218, the routing module 140 analyzes the location information to generate route instructions directing a user to one of at least two storage locations for each of the items for each of the categories. In an example embodiment, the method 200 includes sorting the items into the sections of the carousel or via sectors based on at least one of the two storage locations for each of the items. The route instructions may be printed at a printer associated with the terminal and/or may be transmitted to a hand-held computational device carried by a user who will follow the route instructions. As one example, the terminal may include a receipt printer, and the terminal may be configured to print route instructions on receipt paper roll. The route instructions may include a specific location in a facility. The route instructions may also include the specific section of the carousel for a specific storage location. The route instructions may be ordered instructions indicating at least a first storage location and a second storage location based on where they are located in the facility. For example, the route instructions may direct a user to a first storage location based on its proximity to the terminal, and then a second storage location based on its proximity to the first storage location. In an example embodiment, the route instructions may be generated based on low-stock or low-inventory in a certain storage location, thus prioritizing the low-stock locations to receive more items.

In an example embodiment, when the routing module 140 has completed generating route instructions, a task message may be transmitted from the terminal to a hand-held computational device of a user, where the task message indicates to the user that sorted items are ready for stocking or storing. In an example embodiment, the route instructions may be transmitted from the terminal to a hand-held computational device of a user as well.

In an example embodiment, a section of the carousel or a sector may be associated with more than one category based on, for example, similarities between the categories. For example, a section of the carousel or a sector may be associated with two categories that include items whose storage locations are proximate to one another and/or that share one more common characteristics.

Figure 3:
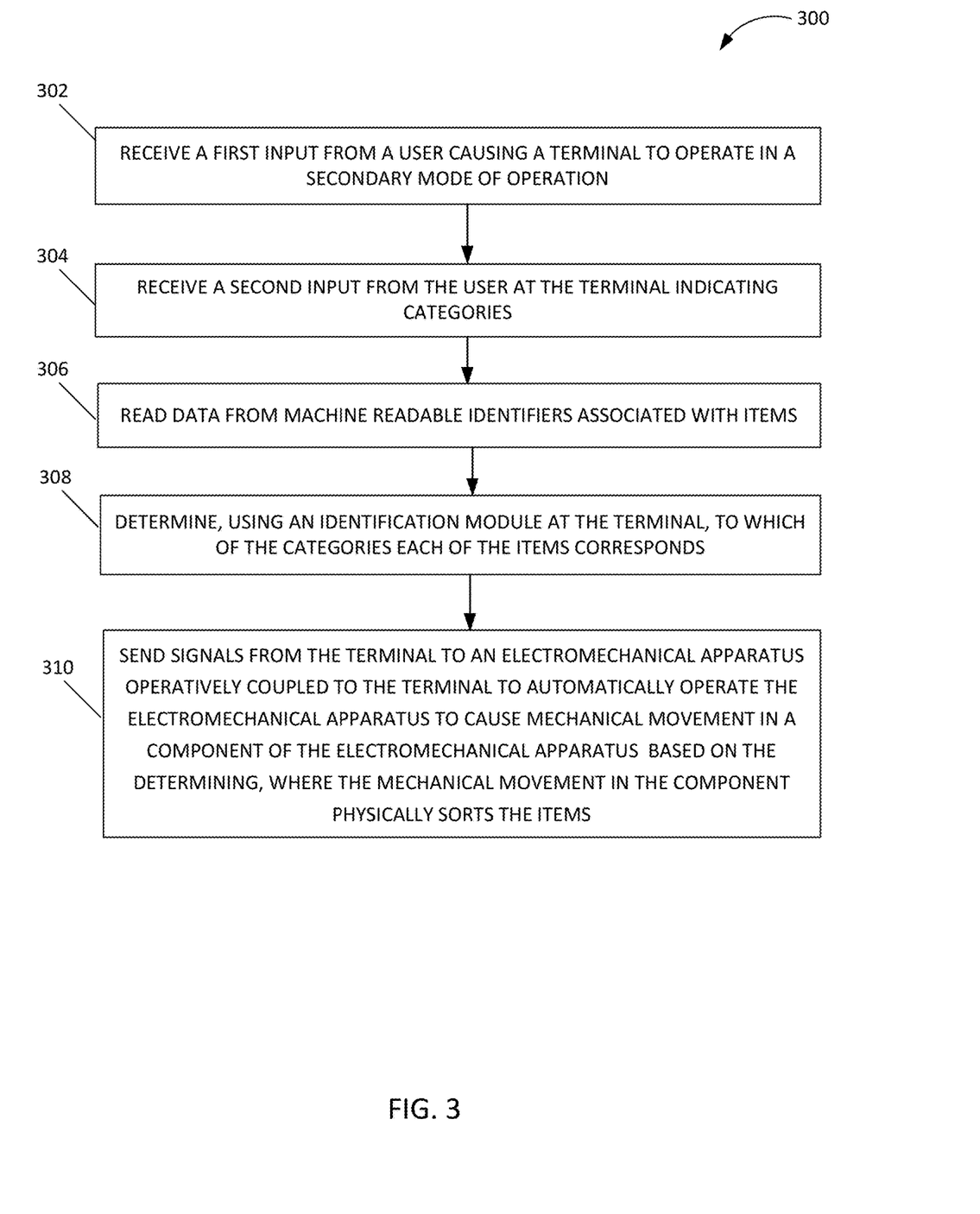
FIG. 3 is a flowchart illustrating another exemplary method for sorting mechanisms at a terminal, according to an example embodiment.

FIG. 3 is a flowchart illustrating another exemplary method 300 for sorting mechanisms at a POS terminal, according to an example embodiment. The method 200 may be performed using one or more modules of the system 100 described above.

At step 302, the sorting module 110 receives a first input from a user causing the terminal to operate in a secondary mode of operation. The terminal may be configured for a first mode of operation that may be the primary mode of operation for the terminal. An input from the user at the terminal causes the terminal to enter or switch to a secondary mode of operation, which is different than and/or exclusive of the primary mode of operation. In the secondary mode of operation, the terminal executes software related to the systems and methods described herein for the secondary mode of operation. In an example embodiment, the terminal is unable to perform operations associated with the primary mode of operation when the terminal is in the secondary mode of operation. For example, the terminal may be configured to perform transactions as the primary mode of operation. In the secondary mode of operation of sorting items, the terminal cannot perform transactions. That is, when an item is scanned at the terminal, rather than adding the item to a transaction, the terminal retrieves location information or characteristics of the item which is used to sort the items into categories and/or to control an operation of an electromechanical apparatus or components thereof.

At step 304, the sorting module 110 receives a second input from the user at the terminal indicating categories. In an example embodiment, the categories are based on storage locations of the items in a facility. In another embodiment, the categories are based on characteristics of the items (physical or non-physical). The user may input information for two or more categories at the terminal. The information may include at least a name of the category. For example, the categories may include, but are not limited to, beauty, personal care, pharmacy, electronics, office, movies, music, books, home improvement, furniture, patio furniture, toys, video games, food, household supplies, cleaning products, pet, photo, gifts, and the like. As another example, the categories may be based on the storage temperature of the items, and may include, but are not limited to, hot items, cold items, frozen items, room-temperature items, and the like. As another example, the categories may be based on the storage or compliance requirements of the items, and may include, but are not limited to, chemicals (e.g., cleaning supplies, pest control items, etc.), food items, clothing items, baby or childcare items, and the like. In this manner, the categories allow items to be sorted based on temperature of items so that hot items are not placed in the same container or bag as cold items. The categories also allow items to be sorted based on compliance or storage requirements so that chemicals are not placed in the same container or bag as food items or baby/childcare items, and food items are not placed in the same container or bag as clothing items.

At step 306, the identification module 120 reads data from machine readable identifiers associated with items. The terminal includes a scanner (e.g., an optical scanner) capable of reading data from machine readable identifiers or machine readable optical labels, for example, barcodes, linear barcodes, Quick Response (QR) codes, two-dimensional barcodes, matrix barcodes, and the like. A user may scan the machine readable identifier affixed on an item or items at the terminal. The terminal may identify or retrieve information from a database (e.g., location database(s) 740 or item database(s) 745) related to the scanned item and store it in memory.

At step 308, the identification module 120 determines at the terminal to which of the categories the items corresponds. The identification module 120 may analyze information related to the scanned items to determine which of the categories each item corresponds. The identification module 120 may use storage location information of an item to determine the corresponding category. In other embodiments, the identification module 120 may use other characteristics of the item to determine the corresponding category. The identification module 120 may retrieve data from a database associated with the items, and analyze the retrieved data and the categories.

At step 310, the apparatus control module 130 sends signals from the terminal to an electromechanical apparatus operatively coupled to the terminal. The apparatus control module 130 sends signals to automatically operate the electromechanical apparatus to cause electromechanical movement in a component of the electromechanical apparatus based on the determining of step 308. The electromechanical movement physically sorts the items. The electromechanical apparatus may be coupled to the terminal via an electric circuit (e.g., a programmable logic circuit).

In an example embodiment, the identification module 120 may generate an alert at the terminal when it is determined that the item does not correspond to any of the categories inputted by the user. The alert may be text or graphical images displayed on a monitor of the terminal. The alert may be accompanied by an audible alert.

In an example embodiment, the electromechanical apparatus includes a diverter controllable by the terminal, and the diverter includes at least one arm. The electromechanical apparatus also includes a conveyor belt disposed between the terminal and the diverter, and at least two sectors extending distally from the diverter. The method 300 may also include sending signals from the terminal to automatically operate the electromechanical apparatus causing the arm of the diverter to automatically move in a first direction if the item is determined to correspond to a first one of the categories.

The method 300 may also include causing the arm of the diverter to automatically move in a second direction if the item is determined to correspond to a second one of the categories. In this manner, moving the arm of the diverter in the first direction directs the item to a first sector of the at least two sectors, and moving the diverter in the second direction directs the item to a second sector of the at least two sectors. In an example embodiment, the item may be moved towards the diverter using the conveyor belt disposed between the terminal and the diverter. The diverter may be disposed at a slope so that the item is caused to travel towards the sectors.

In another embodiment, the electromechanical apparatus includes a carousel operatively coupled to the terminal and disposed adjacent the terminal. The carousel may have at least two sections and the terminal has a user-facing area. The method 300 also includes sending signals from the terminal to automatically operate the electromechanical apparatus causing the carousel to automatically rotate to position a first section of the carousel closest to the user-facing area of the terminal if the item is determined to correspond to a first one of the categories. The method 300 also includes causing the carousel to automatically rotate to position a second section of the carousel closest to the user-facing area of the terminal if the item is determined to correspond to a second one of the categories. In this manner, the carousel is automatically rotated to present a user operating the terminal with the appropriate section for the item to be placed to sort the items based on the categories.

In another embodiment, the electromechanical apparatus includes a carousel operatively coupled to the terminal, where the carousel has at least two sections, and a conveyor belt disposed between the carousel and the terminal. The method 300 also includes sending signals from the terminal to automatically operate the electromechanical apparatus causing the carousel to automatically rotate to align a first section of the at least two sections with the conveyor belt if an item is determined to correspond to a first one of the categories. The method 300 also includes causing the carousel to automatically rotate to align a second section of the at least two sections with the conveyor belt if the item is determined to correspond to a second one of the categories.

In some embodiments, the speed of the conveyor belt can be dynamically adjusted by the terminal to ensure the appropriate section of the carousel is in position before the item being transported by the conveyor belt reaches the carousel. For example, the terminal can determine the time required to rotate the carousel to position the appropriate section for receipt of the item and can control a motor associated with the conveyor belt to slow down or speed so that the item arrives at the carousel after the carousel has been rotated to the appropriate section.

In some embodiments, the speed of at which the carousel rotates can be dynamically adjusted by the terminal to ensure the appropriate section of the carousel is in position before the item being transported by the conveyor belt reaches the carousel. For example, the terminal can determine the time required to transport the item to the carousel and can control a motor associated with the carousel to slow down or speed so that the item arrives at the carousel after the carousel has been rotated to the appropriate section.

In some embodiments, the speed at which the carousel rotates and the speed of the conveyor belt can be dynamically adjusted by the terminal to ensure the appropriate section of the carousel is in position before the item being transported by the conveyor belt reaches the carousel.

In an example embodiment, each section of the carousel includes a weight sensor (e.g., weight sensors 625, 626, 627, and 628 illustrated in FIG. 6) that transmits weight data measured at the section of the carousel to the terminal. If the weight of a particular section is greater than a predefined weight, then the terminal controls the carousel so that the particular section that has reached a weight limit is not presented to the user to accept further items. That is, the carousel is rotated in such a manner that the section of the carousel that has reached a weight limit is not placed closest to the user-facing area of the terminal.

Figure 4:
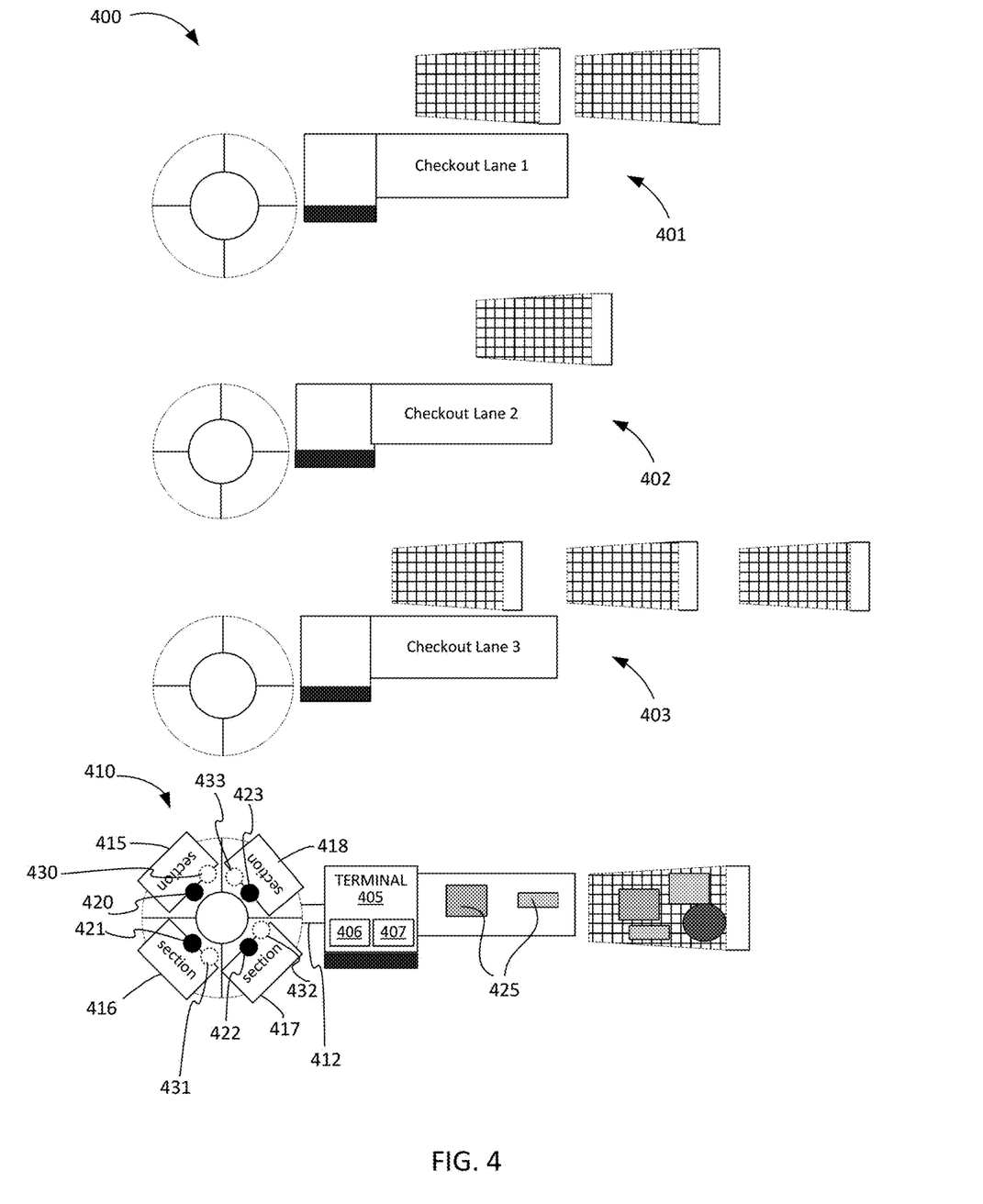
FIG. 4 is a schematic of an exemplary terminal for implementing sorting mechanisms, according to an example embodiment.

FIG. 4 is a schematic of an exemplary POS terminal 405 for implementing sorting mechanisms, according to an example embodiment. Shown in FIG. 4, are POS terminals 401, 402 and 403 in a primary mode of operation. The terminal 405 is shown in a secondary mode of operation. The terminal 405 includes a processor 406 and a scanner 407. The scanner 407 may be an optical scanner for scanning machine readable identifiers or machine readable optical labels associated with items 425. The items 425 may be items to be sorted into categories.

A carousel 410 may be operatively or electrically coupled to the terminal 405 via electric circuit 412 (e.g., a programmable logic circuit). The carousel 410 includes section 415, section 416, section 417, and section 418. Although only four sections are shown here, it should be understood that the carousel 410 may include fewer than four sections or more than four sections. In some embodiments, each section 415-418 may include a tote or container to hold items 425 as they are sorted. Each section 415-418 includes a respective visual indicator 420, 421, 422, and 423. The visual indicators 420-423 are operatively or electrically coupled to the terminal 405 via the electric circuit 412.

As described above, the terminal 405 associates a category to each of the sections 415-418. Based on determining to which of the categories the items correspond, an appropriate visual indicator 420-423 is activated by the terminal to indicate to a user where the items should be placed. In this manner, a user can easily and efficiently sort items at the terminal 405 using the carousel 410.

In an example embodiment, each section of the carousel includes a weight sensor 430, 431, 432, 433 as shown in FIG. 4 that transmits weight data measured at the section of the carousel to the terminal. If the weight of a particular section is greater than a predefined weight, then the terminal sends a signal to the electric circuit to control the unique visual indicator device of that particular section to indicate that the section has reached a weight limit, and therefore additional items should not be sorted or placed in the section.

Figure 5:
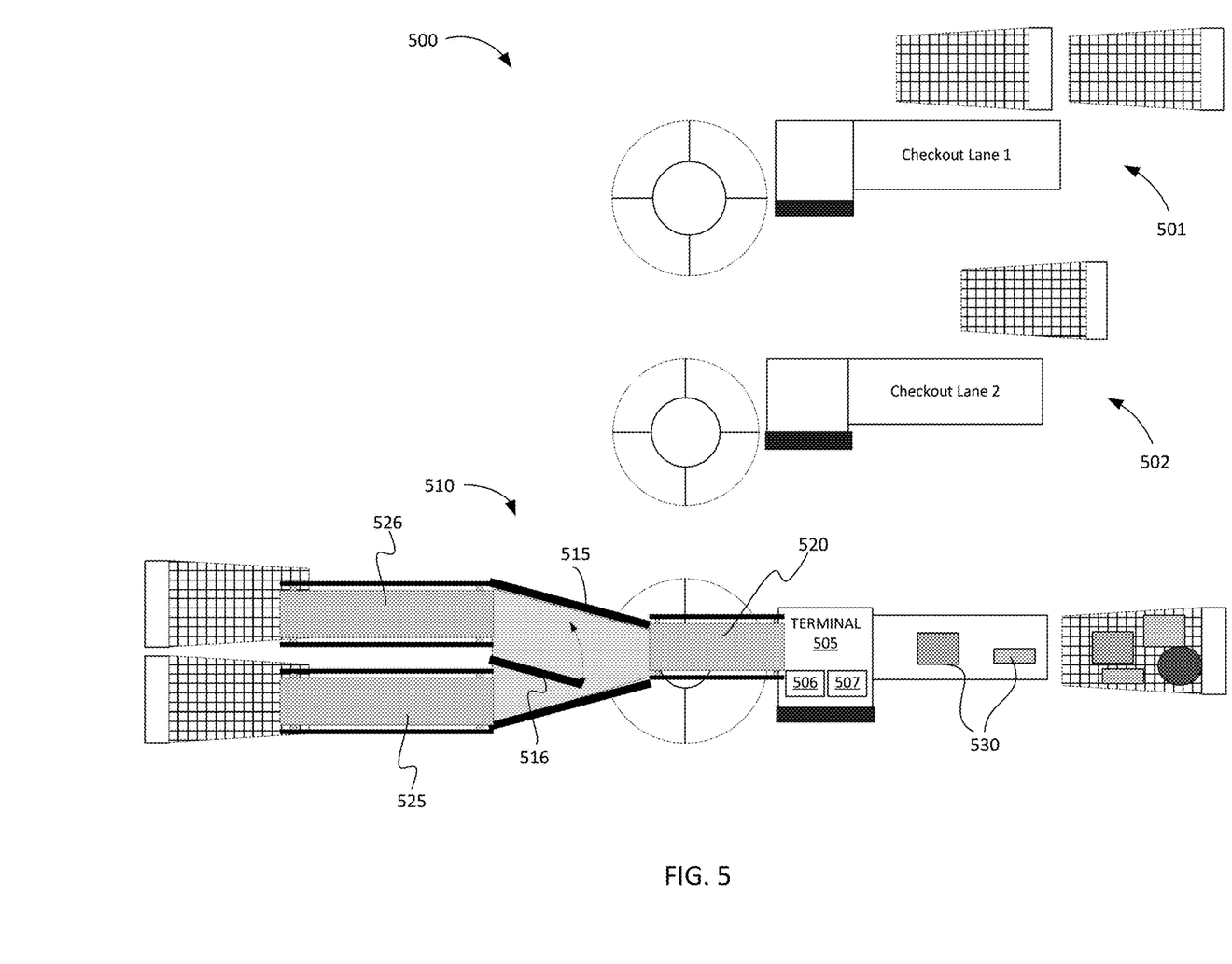
FIG. 5 is a schematic of an exemplary sorting mechanism at a terminal including a diverter, according to an example embodiment.

FIG. 5 is a schematic of an exemplary sorting mechanism at a POS terminal 505 including a diverter 515, according to an example embodiment. Shown in FIG. 5, are POS terminals 501 and 502 in a primary mode of operation. The terminal 505 is shown in a secondary mode of operation. The terminal 505 includes a processor 506 and a scanner 507. The scanner 507 may be an optical scanner for scanning machine readable identifiers or machine readable optical labels associated with items 530. The items 530 may be items to be sorted into categories.

A detachable electromechanical apparatus 510 is operatively coupled to the terminal 505. The electromechanical apparatus 510 includes a diverter 515. The diverter 515 includes a moveable arm 516. For example, arm 516 can include or be operatively coupled to a motor (such as a stepper motor) and the motor can be driven to move the arm 516. The arm 516 may be operatively or electrically coupled to the terminal 505 (e.g., via the motor). An optional conveyor belt 520 is disposed between the terminal 505 and diverter 515, and is configured to move items 530 towards the diverter 515. The electromechanical apparatus 510 also includes sector 525 and sector 526 extending distally from the diverter 516. The sectors 525 and 526 may be disposed at a slope to cause items 530 to travel towards the carts shown in FIG. 5. In some embodiments, the sectors 525 and 526 include conveyor belts to move items 530 towards the carts. In some embodiments, the diverter 515 is disposed at a slope or an angle to cause the items 530 to move towards sectors 525, 526. In some embodiments, the diverter 515 may include a conveyor belt to move items towards the sectors 525, 526.

As described above, the terminal 505 automatically operates the arm 516 of the diverter 515 to sort items 530 based on categories. The user can scan items at the terminal 505, place them on the conveyor belt 520 or on the diverter 515, and the terminal 505 automatically operates the arm 516 to sort the items 530 into categories based on information related to the items 530. The terminal 505 automatically moves the arm 516 of the diverter 515 in a first direction if an item is determined to correspond to a first one of the categories, and the terminal 505 automatically moves the arm 516 of the diverter 515 in a second direction if the item is determined to correspond to a second one of the categories. The arm 516 of the diverter 515 directs the items 530 to one of the at least two sectors 525, 526.

In an example embodiment, the categories indicate a type of item or a storage location of the item. The terminal 505 may also be in communication with a database (e.g., databases 740, 745) that store information related to the items 530.

Although two sectors 525 and 526 are shown, more sectors may be included in the electromechanical apparatus 510. Each sector 525, 526 may be associated with more one category based on similarities of the categories. For example, sector 525 may be associated with two categories that include items whose storage locations are proximate to one another.

Figure 6:
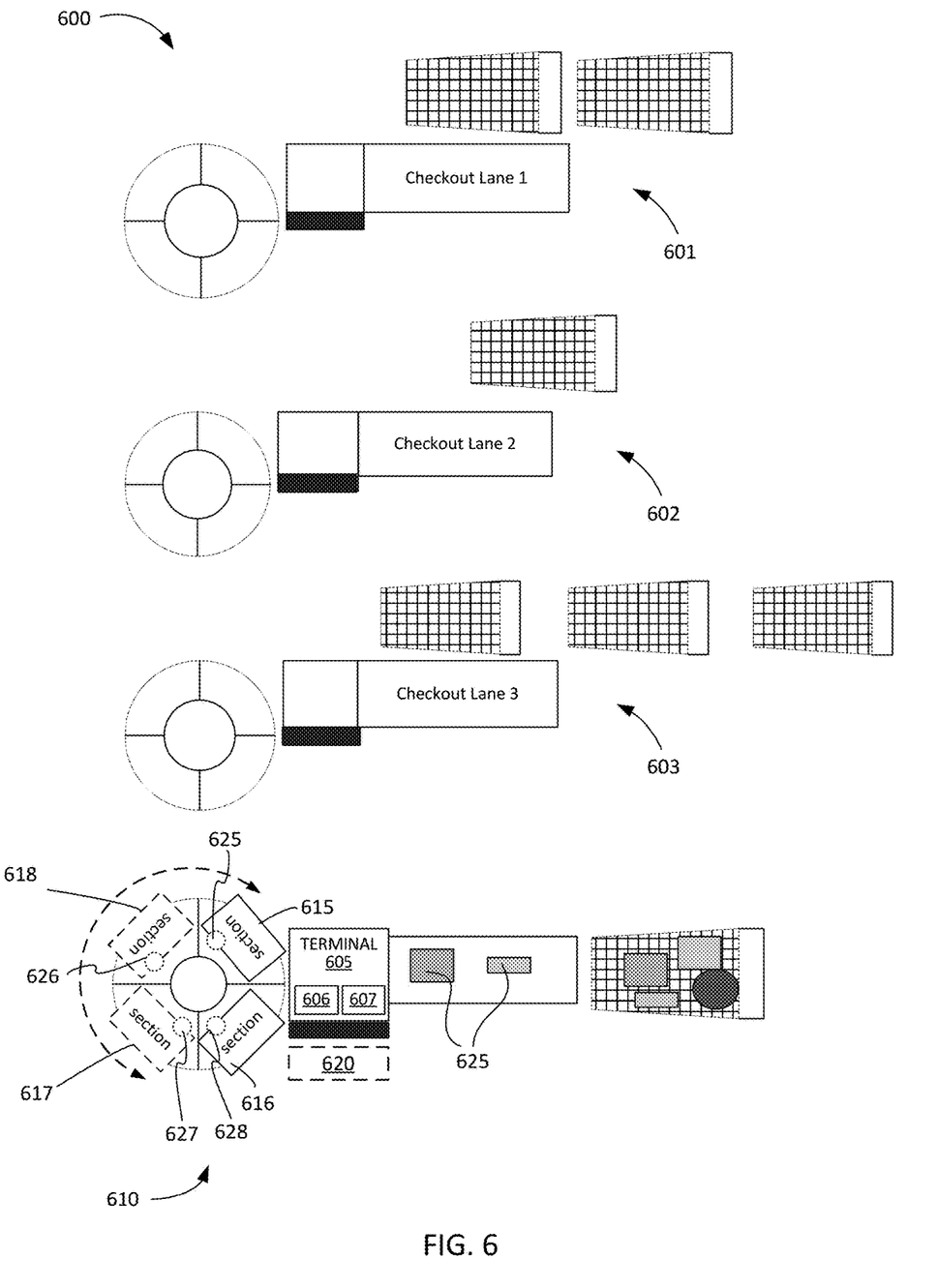
FIG. 6 is a schematic of an exemplary sorting mechanism at a terminal including a carousel, according to an example embodiment.

FIG. 6 is a schematic of an exemplary sorting mechanism at a POS terminal 605 including a carousel 610, according to an example embodiment. Shown in FIG. 6, are POS terminals 601, 602 and 603 in a primary mode of operation. The terminal 605 is shown in a secondary mode of operation. The terminal 605 includes a processor 606 and a scanner 607. The scanner 607 may be an optical scanner for scanning machine readable identifiers or machine readable optical labels associated with items 625. The items 625 may be items to be sorted into categories. Also illustrated in FIG. 6 is a user-facing area 620 of the terminal 605.

The electromechanical apparatus includes a carousel 610 that is operatively or electrically coupled to the terminal 605 via an electric circuit. The carousel 610 can include or be operatively coupled to a motor and the motor can be driven to rotate the carousel 610 in response to signal received from the terminal 605 via the electric circuit. The carousel 610 includes section 615 and section 616. The carousel 610 may also optionally include sections 617 and 618. Although only four sections are shown here, it should be understood that the carousel 610 may include fewer than four section or more than four sections. In some embodiments, each section 615-618 may include a tote or container to hold items 625 as they are sorted.

As described above, the terminal 605 automatically rotates the carousel 610 to position the appropriate section, for example section 616, close or proximate to the user-facing area 620. Rotating the carousel in this manner, indicates to the user where an item should be placed for sorting, and enables the user easy access to the appropriate section. The terminal 605 automatically rotates the carousel 610 to position a first section of the at least two sections closest to the user-facing area 620 of the terminal 605 if an item is determined to correspond to a first one of the categories, and the terminal 605 automatically rotates the carousel 610 to position a second section of the at least two sections closest to the user-facing area 620 of the terminal 605 if the item is determined to correspond to a second one of the categories.

In an example embodiment, each section of the carousel includes a weight sensor 625, 626, 627, 628 as shown in FIG. 6 that transmits weight data measured at the section of the carousel to the terminal. If the weight of a particular section is greater than a predefined weight, then the terminal controls the carousel so that the particular section that has reached a weight limit is not presented to the user to accept further items. That is, the carousel is rotated in such a manner that the section of the carousel that has reached a weight limit is not placed closest to the user-facing area of the terminal.

In an example embodiment, a conveyor belt is disposed between the carousel 610 and the terminal 605. The carousel 610 includes at least two sections, and the terminal 605 automatically rotates the carousel 610 to align a first section of the at least two sections with the conveyor belt if an item is determined to correspond to a first one of the categories, and the terminal 605 automatically rotates the carousel 610 to align a second section of the at least two sections with the conveyor belt if the item is determined to correspond to a second one if the categories. The conveyor belt operates to cause the items 630 placed on the conveyor belt to move towards the aligned section of the carousel 610. In exemplary embodiments, the speed at which the carousel rotates and/or the speed of the conveyor belt can be automatically controlled to ensure that an item reaches the carousel after the appropriate section of the carousel is in position to receive the item.

The systems and methods described herein can enable use of an underused or available POS terminal to sort items in a secondary mode of operation. The POS terminal can be operatively connected to a carousel or an electromechanical apparatus described above. The POS terminal item can be used to efficiently sort items including, but not limited to, returned items, break-packs, orphan or mis-placed items, random items, and the like. The systems and methods described herein can be used to sort items and fulfill orders. For example, one of the categories for sorting may be based on storage location of the items, while another of the categories may be based on orders that need to be fulfilled. The user at the POS terminal can efficiently sort the items into the appropriate categories based on which items are for stocking and which items are for order fulfillment. The user can scan the item at the POS terminal and the POS terminal automatically indicates to the user how to sort the items, or the POS terminal automatically sorts the items for the user. In this manner, an underused POS terminal can be utilized in a secondary mode of operation to reduce waste of systems. In the secondary mode of operation, when an item is scanned, the POS terminal retrieves data for the item that aides in sorting or categorizing of the item, rather than performing a sales transaction. The systems and method described herein also alerts an associate from the appropriate department to return the sorted items to the sales floor shelves. Additionally, the receipt printer at the POS terminal can provide route instructions for the associate to follow to stock the sorted items at the sales floor shelves.

Figure 7:
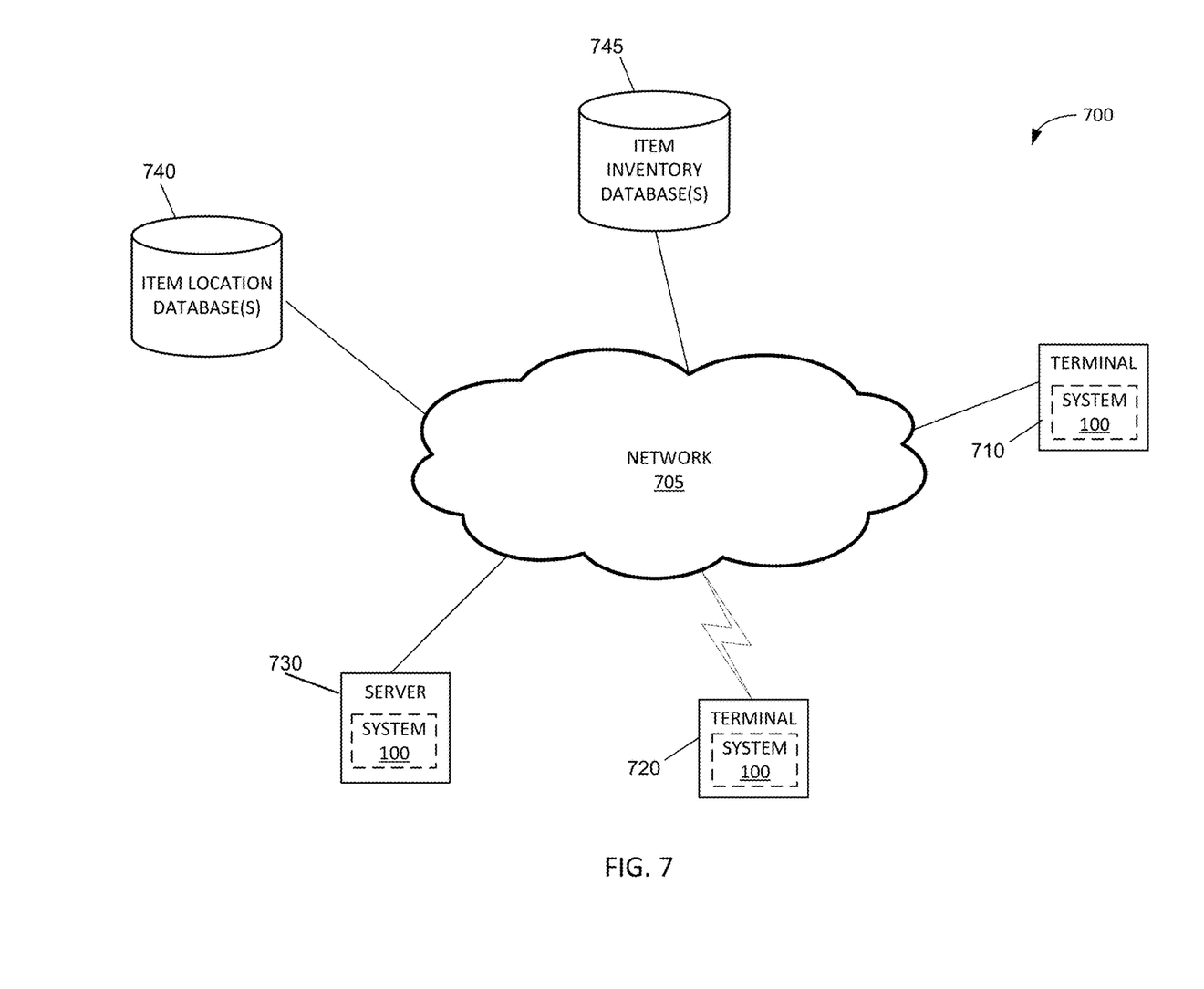
FIG. 7 is a diagram of an exemplary network environment suitable for a distributed implementation of exemplary embodiments.

FIG. 7 illustrates a network diagram depicting a system 700 for implementing the system 100 for sorting mechanisms, according to an example embodiment. The system 700 can include a network 705, POS terminal 710, POS terminal 720, server 730, item location database(s) 740, and item inventory database(s) 745. Each of terminal 710, terminal 720, server 730, and databases 740, 745 is in communication with the network 705.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The terminal 710, 720 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The terminal 710, 720 can include one or more components described in relation to computing device 800 shown in FIG. 8. The terminal 710, 720 may connect to network 705 via a wired or wireless connection. The terminal 710, 720 may include one or more module of system 100.

In an example embodiment, the POS terminals 710, 720 are used to manage and perform various transactions involving one or more items, including a sales transaction, a return transaction, or other transactions. The terminal 710 or 720 may also include various external or peripheral devices to aid in performing transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like. In an example embodiment, the system 100 may print route instructions for a user via the receipt printer.

Each of the database(s) 740, 745, and server 730 is connected to the network 705 via a wired connection. Alternatively, one or more of the database(s) 740, 745, and server 730 may be connected to the network 705 via a wireless connection. Server 730 may include one or more computers or processors configured to communicate with terminals 710 and 720 via network 705. Server 730 hosts one or more applications accessed by terminal 710 and terminal 720, and/or facilitates access to the content of databases 740, 745. Server 730 may also include one or more modules of the system 100. Databases 740, 745 include one or more storage devices for storing data and/or instructions (or code) for use by server 730, and/or terminal 710, 720. Databases 740, 745 and server 730 may be located at one or more geographically distributed locations from each other or from terminal 710, 720. Alternatively, databases 740, 745 may be included within server 730.

The location database(s) 740 may store location information for items in a facility. The location information may include an aisle number, shelf number, department name, and the like. The item database(s) 745 may store information related to items, including physical and non-physical characteristics. Non-physical characteristics of the items may include order fulfillment information, inventory levels, and the like.

Figure 8:
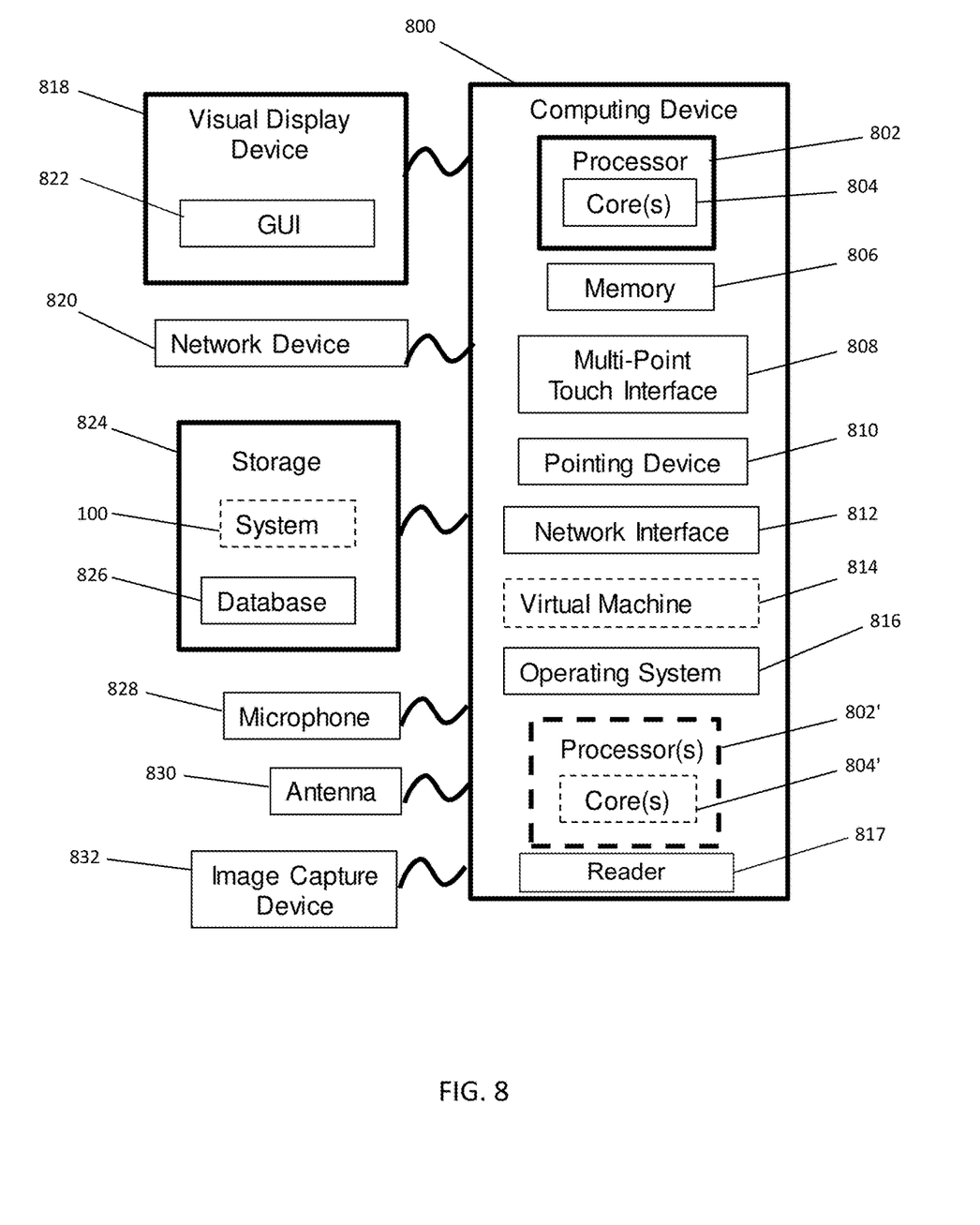
FIG. 8 is a block diagram of an exemplary computing device that may be used to implement exemplary embodiments described herein.

FIG. 8 is a block diagram of an exemplary computing device 800 that can be used to perform the methods provided by exemplary embodiments. In exemplary embodiments, the computing device 800 can be embodied by the embodiments of the POS terminals and servers described herein. The computing device 800 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 806 included in the computing device 800 can store computer-readable and computer-executable instructions or software for implementing exemplary embodiments. The computing device 800 also includes processor 802 and associated core 804, and optionally, one or more additional processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' can each be a single core processor or multiple core (804 and 804') processor.

Virtualization can be employed in the computing device 800 so that infrastructure and resources in the computing device can be shared dynamically. A virtual machine 814 can be provided to handle a process running on multiple processors so that the process appears to be using only one computing resource rather than multiple computing resources. Multiple virtual machines can also be used with one processor.

Memory 806 can include a computer system memory or random access memory, such as DRAM, SRAM, EDO RAM, and the like. Memory 806 can include other types of memory as well, or combinations thereof.

A user can interact with the computing device 800 through a visual display device 818, such as a touch screen display or computer monitor, which can display one or more user interfaces 819 that can be provided in accordance with exemplary embodiments. The visual display device 818 can also display other aspects, elements and/or information or data associated with exemplary embodiments. The computing device 800 can include other I/O devices for receiving input from a user, for example, a keyboard or another suitable multi-point touch interface 808, a pointing device 810 (e.g., a pen, stylus, mouse, or trackpad). The keyboard 808 and the pointing device 810 can be coupled to the visual display device 818. The computing device 800 can include other suitable conventional I/O peripherals.

In one embodiment, the computing device 800 includes a reader 817. The reader 817 may be able to read or scan machine readable identifiers, such as optical machine-readable labels, RFID tags or identifiers, and the like.

The computing device 800 can also include one or more storage devices 824, such as a hard-drive, CD-ROM, or other computer readable media, for storing data and computer-readable instructions and/or software, such as the system 100 that implements exemplary embodiments of the sorting mechanisms described herein, or portions thereof, which can be executed to generate user interface 819 on display 818. Exemplary storage device 824 can also store one or more databases for storing suitable information required to implement exemplary embodiments. The databases can be updated by a user or automatically at a suitable time to add, delete or update one or more items in the databases. Exemplary storage device 824 can store one or more databases 826 for storing location information, item information, and other data/information used to implement exemplary embodiments of the systems and methods described herein.

The computing device 800 can include a network interface 812 configured to interface via one or more network devices 822 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of the above. The network interface 812 can include a built-in network adapter, network interface card, PCMCIA network card, card bus network adapter, wireless network adapter, USB network adapter, modem or another device suitable for interfacing the computing device 800 to a type of network capable of communication and performing the operations described herein. Moreover, the computing device 800 can be a computer system, such as a workstation, desktop computer, server, laptop, handheld computer, tablet computer (e.g., the iPad® tablet computer), mobile computing or communication device (e.g., the iPhone® communication device, a computing device employing the Android™ operating system), or other form of computing or telecommunications device that is capable of communication and that has sufficient processor power and memory capacity to perform the operations described herein.

The computing device 800 can run operating systems 816, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or another operating system capable of running on the computing device and performing the operations described herein. In exemplary embodiments, the operating system 816 can be run in native mode or emulated mode. In an exemplary embodiment, the operating system 816 can be run on one or more cloud machine instances.

The following description is presented to enable a person skilled in the art to create and use a computer system configuration and related method and systems for sorting mechanisms at a terminal. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that the embodiments may be practiced without the use of these specific details. In other instances, well-known structures and processes are shown in block diagram form in order not to obscure the description of embodiments with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A sorting system comprising:
 a point-of-sale (POS) terminal having a processor and a scanner;
 a detachable electromechanical apparatus operatively coupled to the POS terminal and comprising:
  a diverter controllable by the POS terminal, the diverter having an arm;
  a conveyor belt detachably disposed between the POS terminal and the diverter; and
  at least two sectors extending distally from the diverter;
 wherein the POS terminal is configured to:
  operate in a secondary mode of operation in response to receiving a first input from a user wherein the secondary mode of operation is sorting and the secondary mode of operation disables the primary mode of operation as a POS terminal, receive a second input from the user indicating categories, read data, via the scanner, from machine readable identifiers associated with items;

determine using an identification module to which of the categories the items correspond, and send signals to the electromechanical apparatus to automatically operate the electromechanical apparatus to cause mechanical movement of the arm of the diverter based on the determining, wherein the mechanical movement of the arm of the diverter physically sorts the items.

2. The system of claim 1, the POS terminal automatically moves the arm of the diverter in a first direction if an item is determined to correspond to a first one of the categories, and the POS terminal automatically moves the arm of the diverter in a second direction if the item is determined to correspond to a second one of the categories; and wherein the arm of the diverter directs the items to one of the at least two sectors.

3. The system of claim 1, wherein the conveyor belt is configured to move the items towards the diverter, and the diverter is disposed at a slope causing the items to travel toward the at least two sectors.

4. The system of claim 1, wherein categories indicate a type of item or a location of the items in a facility.

5. The system of claim 1, further comprising a database in communication with the terminal, the database storing information related to the items stored in a facility.

6. The system of claim 1, wherein the terminal is unable to perform in operations associated with a primary mode of operation while in the secondary mode of operation.

7. The system of claim 1, wherein each of the at least two sectors is a conveyor belt.

\* \* \* \* \*